(12) United States Patent
Iwahori et al.

(10) Patent No.: US 12,730,126 B2
(45) Date of Patent: Sep. 8, 2026

(54) INSPECTION METHOD OF INSPECTING MOVING OBJECT

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 18/655,790

(22) Filed: May 6, 2024

(65) Prior Publication Data

US 2024/0393362 A1 Nov. 28, 2024

(30) Foreign Application Priority Data

May 25, 2023 (JP) ................................ 2023-085845

(51) Int. Cl.

| | |
|---|---|
| ***G01P 21/02*** | (2006.01) |
| ***B60T 8/172*** | (2006.01) |
| ***B60W 40/105*** | (2012.01) |
| ***G01C 21/12*** | (2006.01) |
| ***G01M 17/007*** | (2006.01) |

(52) U.S. Cl.

CPC ............. *G01P 21/02* (2013.01); *B60T 8/172* (2013.01); *B60W 40/105* (2013.01); *G01C 21/12* (2013.01); *G01M 17/007* (2013.01); *B60T 2250/042* (2013.01); *B60W 2520/28* (2013.01)

(58) Field of Classification Search

None

See application file for complete search history.

(56) References Cited

U.S. PATENT DOCUMENTS

2010/0168955 A1* 7/2010 Takeda .............. G05B 23/0245 701/31.4

2021/0396532 A1* 12/2021 Tamori ................ G05D 1/0276

FOREIGN PATENT DOCUMENTS

JP 2020-060459 A 4/2020

* cited by examiner

*Primary Examiner* — Eric S. McCall

*Assistant Examiner* — Nigel H Plumb

(74) *Attorney, Agent, or Firm* — Sughrue Mion, PLLC

(57) ABSTRACT

An method of inspecting a moving object movable by remote control includes: a first step of giving an instruction from a server to a moving object as an inspection target to drive the moving object so that an output value relating to moving of the moving object becomes a predetermined target value; a second step of acquiring a measured output value from inspection on the moving object; an auxiliary inspection step of performing the first and second steps on a normal moving object different from the moving object as the inspection target and about which the output value is normal when a difference between the target and measured values is not within a predetermined first range; and a third step of outputting information indicating an abnormality in the server when the difference between the target and measured values is outside a predetermined second range in the normal moving object.

5 Claims, 8 Drawing Sheets

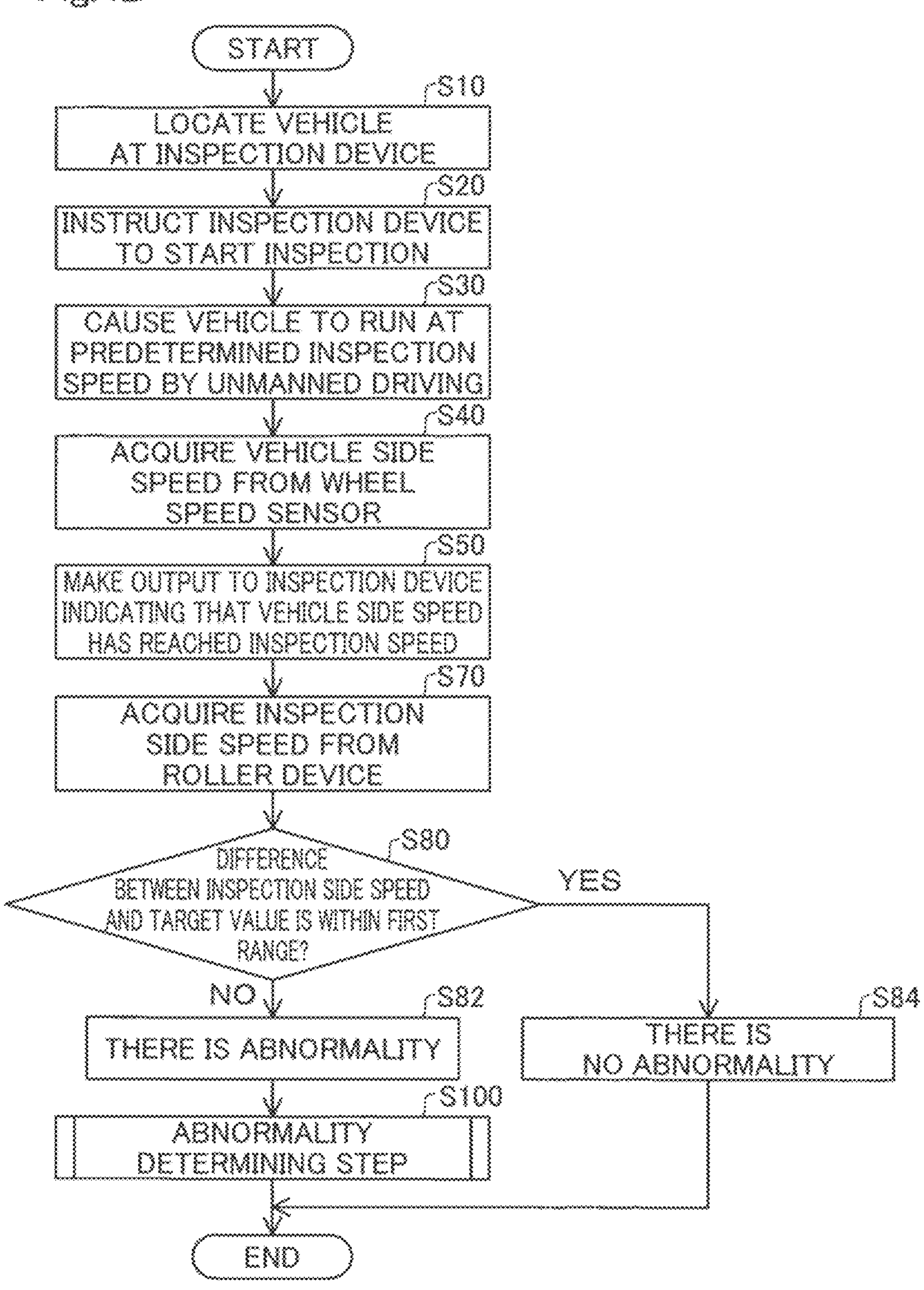
Fig.4B
START
S10
LOCATE VEHICLE AT INSPECTION DEVICE
S20
INSTRUCT INSPECTION DEVICE TO START INSPECTION
S30
CAUSE VEHICLE TO RUN AT PREDETERMINED INSPECTION SPEED BY UNMANNED DRIVING
S40
ACQUIRE VEHICLE SIDE SPEED FROM WHEEL SPEED SENSOR
S50
MAKE OUTPUT TO INSPECTION DEVICE INDICATING THAT VEHICLE SIDE SPEED HAS REACHED INSPECTION SPEED
S70
ACQUIRE INSPECTION SIDE SPEED FROM ROLLER DEVICE
S80
DIFFERENCE BETWEEN INSPECTION SIDE SPEED AND TARGET VALUE IS WITHIN FIRST RANGE?
YES
NO
S82
THERE IS ABNORMALITY
S84
THERE IS NO ABNORMALITY
S100
ABNORMALITY DETERMINING STEP
END

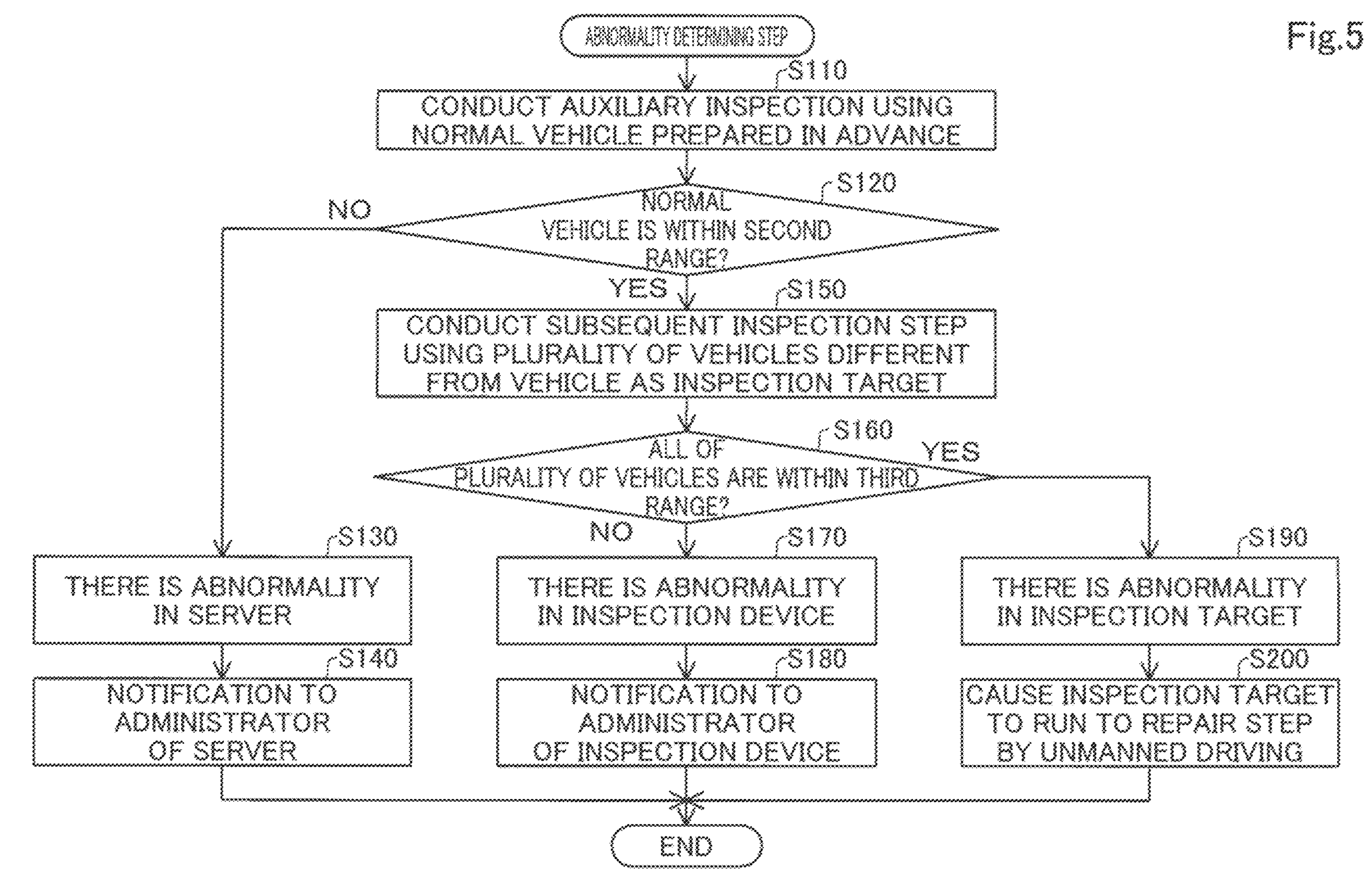
Fig.5
ABNORMALITY DETERMINING STEP
S110
CONDUCT AUXILIARY INSPECTION USING NORMAL VEHICLE PREPARED IN ADVANCE
S120
NORMAL VEHICLE IS WITHIN SECOND RANGE?
NO
YES
S150
CONDUCT SUBSEQUENT INSPECTION STEP USING PLURALITY OF VEHICLES DIFFERENT FROM VEHICLE AS INSPECTION TARGET
S160
ALL OF PLURALITY OF VEHICLES ARE WITHIN THIRD RANGE?
YES
NO
S130
THERE IS ABNORMALITY IN SERVER
S140
NOTIFICATION TO ADMINISTRATOR OF SERVER
S170
THERE IS ABNORMALITY IN INSPECTION DEVICE
S180
NOTIFICATION TO ADMINISTRATOR OF INSPECTION DEVICE
S190
THERE IS ABNORMALITY IN INSPECTION TARGET
S200
CAUSE INSPECTION TARGET TO RUN TO REPAIR STEP BY UNMANNED DRIVING
END

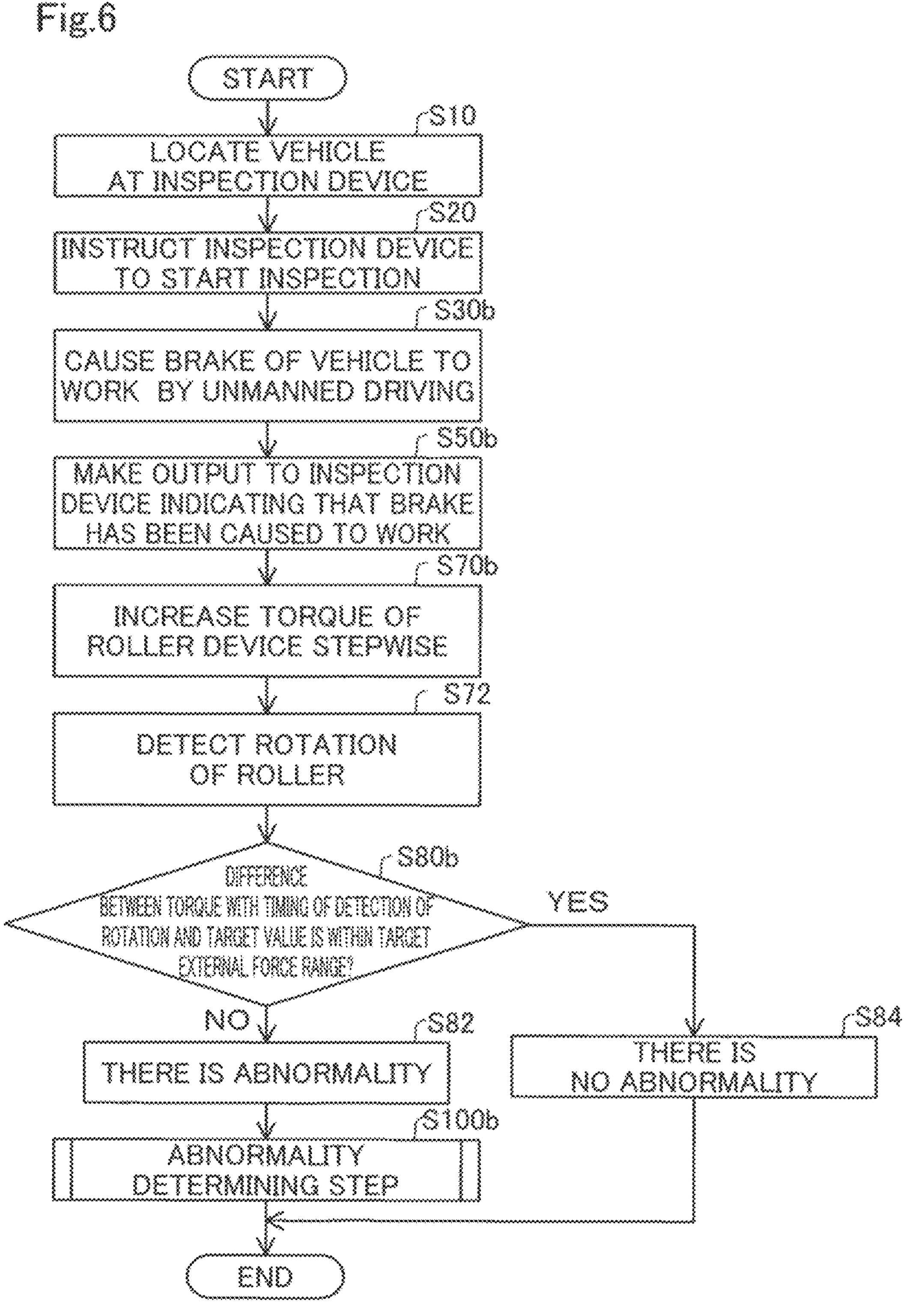
Fig.6
START
S10
LOCATE VEHICLE AT INSPECTION DEVICE
S20
INSTRUCT INSPECTION DEVICE TO START INSPECTION
S30b
CAUSE BRAKE OF VEHICLE TO WORK BY UNMANNED DRIVING
S50b
MAKE OUTPUT TO INSPECTION DEVICE INDICATING THAT BRAKE HAS BEEN CAUSED TO WORK
S70b
INCREASE TORQUE OF ROLLER DEVICE STEPWISE
S72
DETECT ROTATION OF ROLLER
S80b
DIFFERENCE BETWEEN TORQUE WITH TIMING OF DETECTION OF ROTATION AND TARGET VALUE IS WITHIN TARGET EXTERNAL FORCE RANGE?
YES
NO
S82
THERE IS ABNORMALITY
S84
THERE IS NO ABNORMALITY
S100b
ABNORMALITY DETERMINING STEP
END

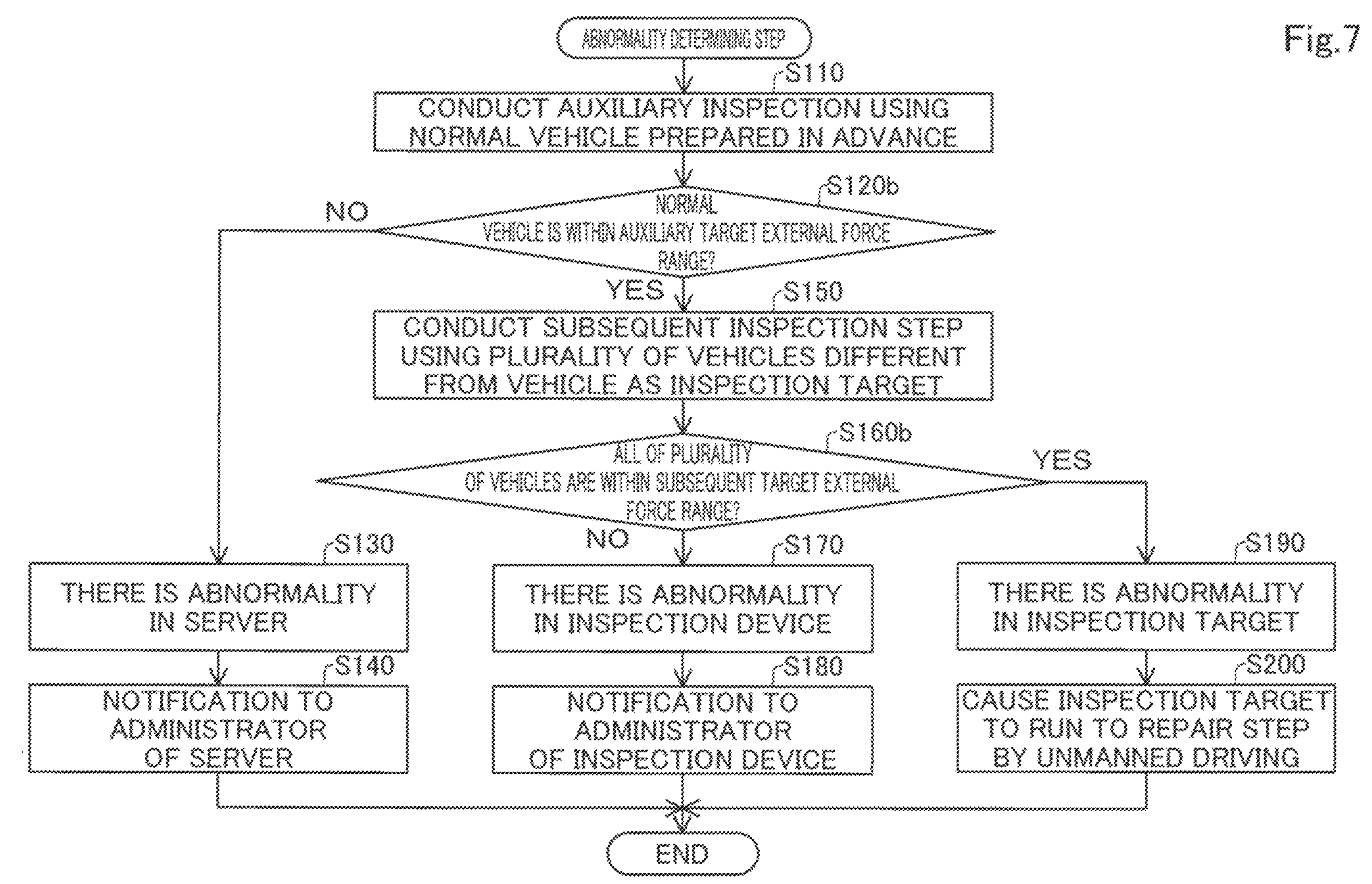
Fig. 7
ABNORMALITY DETERMINING STEP
S110
CONDUCT AUXILIARY INSPECTION USING NORMAL VEHICLE PREPARED IN ADVANCE
S120b
NORMAL VEHICLE IS WITHIN AUXILIARY TARGET EXTERNAL FORCE RANGE?
NO
YES
S150
CONDUCT SUBSEQUENT INSPECTION STEP USING PLURALITY OF VEHICLES DIFFERENT FROM VEHICLE AS INSPECTION TARGET
S160b
ALL OF PLURALITY OF VEHICLES ARE WITHIN SUBSEQUENT TARGET EXTERNAL FORCE RANGE?
YES
NO
S130
THERE IS ABNORMALITY IN SERVER
S140
NOTIFICATION TO ADMINISTRATOR OF SERVER
S170
THERE IS ABNORMALITY IN INSPECTION DEVICE
S180
NOTIFICATION TO ADMINISTRATOR OF INSPECTION DEVICE
S190
THERE IS ABNORMALITY IN INSPECTION TARGET
S200
CAUSE INSPECTION TARGET TO RUN TO REPAIR STEP BY UNMANNED DRIVING
END

INSPECTION METHOD OF INSPECTING MOVING OBJECT

CROSS REFERENCE TO RELATED APPLICATIONS

The present application claims priority from Japanese patent application No. 2023-085845 filed on May 25, 2023, the disclosure of which is hereby incorporated in its entirety by reference into the present application.

BACKGROUND

Field

The present disclosure relates to an inspection method of inspecting a moving object.

Related Art

For example, Japanese Patent Application Publication No. 2020-60459 discloses an inspection system by which a worker causes a vehicle to run on a roller device to inspect a speed meter of the vehicle for abnormality using a sensor vehicle speed acquired by a vehicle speed sensor of the vehicle and a roller vehicle speed acquired by the roller device. This inspection system determines that there is abnormality in the speed meter of the vehicle when the roller vehicle speed is not within a predetermined reference range.

However, even if abnormality is detected using an inspection device, the detected abnormality is not always abnormality in the vehicle but may be abnormality in the inspection device, for example. Furthermore, when the inspection is conducted while the vehicle is caused to run by unmanned driving, the detected abnormality may be abnormality in a server that implements the unmanned driving. The conventional technique has a problem that, on the occurrence of abnormality, it is impossible to determine whether a cause for the abnormality is the vehicle, the inspection device, or the server.

SUMMARY

The present disclosure is feasible in the following aspects.

(1) According to one aspect of the present disclosure, an inspection method of inspecting a moving object movable by unmanned driving is provided. The inspection method comprises: a first step of giving an instruction from a server to a moving object as an inspection target to drive the moving object in such a manner that an output value relating to moving of the moving object becomes a predetermined target value; a second step of measuring the output value and acquiring a measured value using an inspection device for inspection on the moving object; an auxiliary inspection step of performing the first step and the second step on a normal moving object different from the moving object as the inspection target and about which the output value is normal when a difference between the target value and the measured value is not within a predetermined first range; and a third step of outputting information indicating the presence of abnormality in the server when the difference between the target value and the measured value is outside a predetermined second range in the normal moving object as a result of the auxiliary inspection step.

According to the inspection method of this aspect, the auxiliary inspection is conducted during the inspection on the moving of the moving object movable by unmanned driving. Thus, of the moving object as the inspection target, the inspection device, and the server, it is possible to determine that a cause for the abnormality is the server.

(2) The inspection method of the above-described aspect may comprise: a subsequent inspection step of further performing the first step and the second step on a plurality of the moving objects different from the moving object as the inspection target and different from the normal moving object when the difference between the target value and the measured value is within the second range in the normal moving object as a result of the auxiliary inspection step; and a fourth step of outputting information indicating the presence of abnormality in the moving object as the inspection target when the difference between the target value and the measured value is within a predetermined third range in all the moving objects among the plurality of the moving objects as a result of the subsequent inspection step.

According to the inspection method of this aspect, the subsequent inspection is conducted during the inspection on the moving object movable by unmanned driving. Thus, of the moving object as the inspection target and the inspection device, it is possible to determine that a cause for the abnormality is the inspection target.

(3) In the inspection method of the above-described aspect, the normal moving object may at least one of a moving object determined to be free from abnormality as a result of inspection by the inspection device conducted while the moving object is moved by manual operation and a moving object determined to be free from abnormality as a result of implementation of the first step and the second step by an inspection device different from the inspection device.

According to the inspection method of this aspect, it is possible to prepare the normal moving object by a simple way.

(4) In the inspection method of the above-described aspect, when information indicating the presence of abnormality in the server is output, the abnormality in the server may be notified to an administrator of the server.

According to the inspection method of this aspect, notifying the determination result about the cause for the abnormality allows the server to be repaired in an early stage.

(5) According to another aspect of the present disclosure, an inspection method of inspecting a moving object capable of moving and capable of being stopped moving by unmanned driving is provided. The inspection method may comprise: a stop instructing step of giving an instruction from a server to a moving object as an inspection target to cause a stopping unit of the moving object to work to stop a moving motion of the moving object in such a manner that braking force applied by the stopping unit becomes a predetermined target value; an external force acquiring step of applying external force for causing the moving object to make the moving motion to the moving object as the inspection target while increasing the external force stepwise, and acquiring the external force using an inspection device for inspection on the moving object, the external force being acquired with timing of switching from a state where the moving motion is stopped by the stopping unit to a state where the moving motion is made; an auxiliary inspection step of performing the stop instructing step and the external force acquiring step on a normal moving object different from the moving object as the inspection target and in which the braking force is normal when a difference between the external force acquired with the timing and external force corresponding to the target value is not within a predetermined target external force range; and an abnormality outputting step of outputting information indicating the presence of abnormality in the server when the difference between the external force acquired with the timing and the external force corresponding to the target value is outside a predetermined auxiliary target external force range in the normal moving object as a result of the auxiliary inspection step.

According to the inspection method of this aspect, the auxiliary inspection is conducted during the inspection on the stopping unit of the moving object movable by unmanned driving. Thus, of the moving object as the inspection target, the inspection device, and the server, it is possible to determine that a cause for the abnormality is the server.

The present disclosure is also feasible in various aspects other than the inspection method. For example, the present disclosure is feasible in aspects including an inspection system for a moving object, an inspection device, a method of manufacturing a moving object, a method of controlling an inspection system, a method of controlling an inspection device, a computer program realizing such control methods, and a non-transitory recording medium storing such a computer program.

BRIEF DESCRIPTION OF THE DRAWINGS

FIG. 4B is a flowchart showing a processing routine of an inspection method according to the first embodiment;

FIG. 5 is a flowchart showing a processing routine of an abnormality determining step;

FIG. 6 is a flowchart showing a processing routine of an inspection method according to a second embodiment; and FIG. 7 is a flowchart showing a processing routine of an abnormality determining step of the inspection method according to the second embodiment.

DETAILED DESCRIPTION

A. First Embodiment

Figure 1:
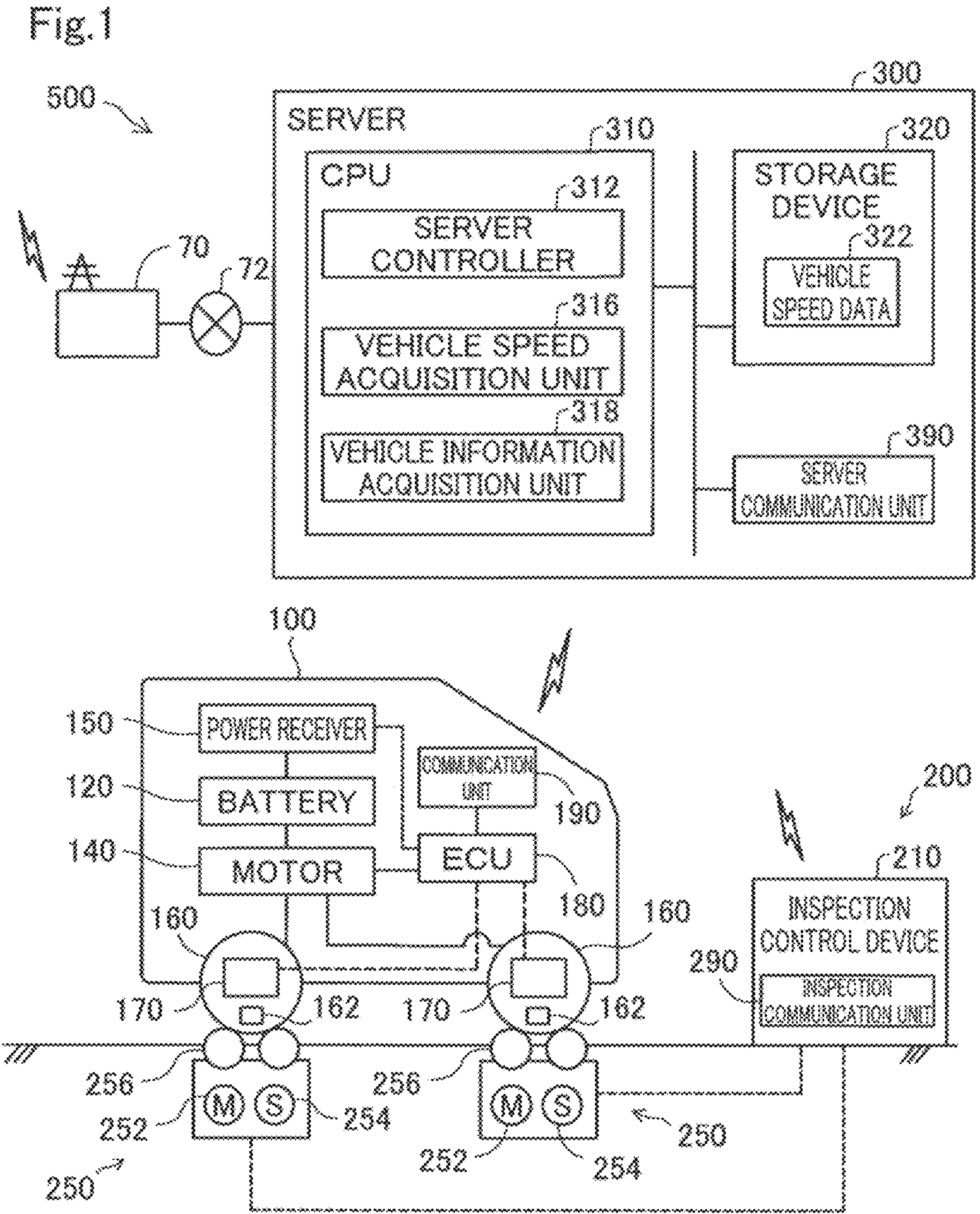
FIG. 1 is an explanatory view showing a schematic configuration of an inspection system according to a first embodiment.

FIG. 1 is an explanatory view showing a schematic configuration of an inspection system 500 according to a first embodiment of the present disclosure. The inspection system 500 is used in a factory for manufacture of a vehicle 100 as a moving object capable of running by unmanned driving, for example. The inspection system 500 includes an inspection device 200 and a server 300. The inspection system 500 conducts inspection to determine whether the vehicle 100 is capable of running normally at a certain running speed by unmanned driving.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

Preferably, the vehicle 100 is a battery electric vehicle (BEV). The vehicle 100 includes a vehicle communication unit 190, a power receiver 150, a motor 140, a battery 120, a wheel speed sensor 170, and an electronic control unit (ECU) 180.

The vehicle communication unit 190 makes radio communication via an access point 70 in the factory with devices external to the vehicle 100 such as the inspection device 200 and the server 300 connected to a network 72. The vehicle communication unit 190 transmits output values corresponding to items of inspection by the inspection device 200 such as a running speed of the vehicle 100, braking force of a brake, the number of rotations of a wheel 160, and a state of charge (SOC) of the battery 120 to the server 300 or the inspection device 200.

The power receiver 150 includes a receiving circuit and a receiving unit not shown in the drawings, for example. The receiving unit is a feeding inlet, for example, conforming to a feeding connector of a charger. The receiving unit may be replaced with a receiving resonant circuit for receiving power by non-contact feeding using an electromagnetic induction phenomenon supplied from the charger via a feeding resonant circuit. The receiving circuit includes a rectifier, a DC/DC converter, etc. When alternating-current power is supplied from the receiving unit, the receiving circuit converts the supplied alternating-current power to direct-current power using the rectifier. The converted direct-current power is supplied to the battery 120 via the DC/DC converter.

The motor 140 is an alternating-current synchronous motor, for example, and functions as an electric motor and a generator. When the motor 140 functions as the electric motor, the motor 140 is driven by power stored in the battery 120 as a power source. Output from the motor 140 is transmitted via a decelerator and an axle to the wheel 160. During deceleration of the vehicle 100, the motor 140 functions as the generator using the rotation of the wheel 160 to generate regenerative power.

The rotation of the wheel 160 is one embodiment of a "moving motion" that is a motion for moving a moving object. The wheel 160 is one embodiment of a "moving unit" as a part of the moving object to make the moving motion. A brake 162 for stopping the rotation of the wheel 160 is one embodiment of a "stopping unit" provided at the moving object and used for stopping the moving motion of the moving object.

The battery 120 is a chargeable secondary battery such as a lithium-ion battery or a nickel-hydrogen battery, for example. The battery 120 stores power to be used for running of the vehicle 100, etc. When the battery 120 receives power supplied to the power receiver 150 from the charger and regenerative power generated by the motor 140, the battery 120 is charged to increase a state of charge of the battery 120. A power control unit (PCU) including an inverter, a boost converter, and a DC/DC converter may be connected between the battery 120 and the motor 140.

The wheel speed sensor 170 detects a rotation speed of each wheel 160. The wheel speed sensor 170 calculates a running speed of the vehicle 100 using the detected rotation speed of each wheel 160. More specifically, the wheel speed sensor 170 performs arithmetic operation such as averaging respective rotation speeds of the wheels 160, for example, and then calculates a running speed of the vehicle 100 using a rotation speed per unit time. At least part of the function of calculating a running speed of the vehicle 100 may be fulfilled by a vehicle speed acquisition unit 316 of the server 300 or the ECU 180 having acquired a rotation speed of the wheel 160 from the wheel speed sensor 170.

A device provided at a moving object and detecting an output value relating to moving of the moving object is also called a "moving object detection unit." The "output value relating to moving of the moving object" may include a moving speed of the moving object and various types of output values usable for deriving the moving speed of the moving object. The output value detected by the moving object detection unit is also called a "moving object side output value."

A device provided at the vehicle 100 and detecting an output value relating to running of the vehicle 100 is also called a "vehicle detection unit." The wheel speed sensor 170 is one embodiment of the "vehicle detection unit." The "output value relating to running of the vehicle 100" may include a running speed of the vehicle 100, and various types of output values such as the number of rotations of the wheel 160, a rotation speed of the wheel 160, and a torque of the wheel 160, for example, usable for deriving the running speed of the vehicle 100. The running speed of the vehicle 100 detected by the vehicle detection unit is also called a "vehicle side speed."

Figure 2:
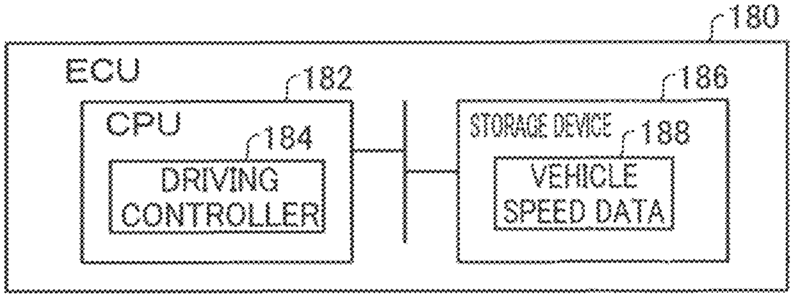
FIG. 2 is a block diagram showing an internal functional configuration of an ECU.

FIG. 2 is a block diagram showing an internal functional configuration of the ECU 180. The ECU 180 is mounted on the vehicle 100 and implements various types of control over the vehicle 100. The ECU 180 includes a storage device 186 that may be a hard disk drive (HDD), a solid state drive (SSD), an optical recording medium, or a semiconductor memory, a CPU 182 as a central processing unit, and others. The storage device 186 has a readable/writable area where vehicle speed data 188 is stored. The vehicle speed data 188 is the vehicle side speed acquired from the wheel speed sensor 170. The storage device 186 stores a computer program for realizing at least some of functions provided in the present embodiment. The CPU 182 executes various computer programs stored in a memory to realize a function such as a driving controller 184.

The driving controller 184 implements driving control over the vehicle 100. The "driving control" is various types of control such as adjustment of an acceleration, a speed, and a rudder angle, for example, for driving actuators to fulfill functions of the vehicle 100 including "run," "turn," and "stop." Under driving control over the vehicle 100 by unmanned driving, the driving controller 184 controls each actuator mounted on the vehicle 100 in response to a request for remote control received from the server 300 via the vehicle communication unit 190. In the present embodiment, the actuator includes an actuator of a driving device for accelerating the vehicle 100, an actuator of a steering device for changing a traveling direction of the vehicle 100, and an actuator of a braking device for decelerating the vehicle 100. The driving device includes the battery 120, the motor 140, and the wheel 160. The actuator of the driving device includes the motor 140. The actuator may further include an actuator for making a swinging motion of a wiper of the vehicle 100 or an actuator for opening and closing a power window of the vehicle 100, for example.

When a driver is on-board the vehicle 100, the driving controller 184 controls an actuator in response to operation by the driver, thereby allowing vehicle 100 to run. The driving controller 184 also allows the vehicle 100 to run by controlling the actuator in response to a control command transmitted from the server 300 independently of whether a driver is on-board the vehicle 100.

Referring back to FIG. 1, the server 300 implements driving control over the vehicle 100 by remote control. The server 300 conducts conveyance of the vehicle 100 and others during a course of manufacture in the factory by causing the vehicle 100 to run automatically, for example. The conveyance of the vehicle 100 using automatic running by remote control is also called "self-running conveyance." The server 300 allows the vehicle 100 to move by remote control without using a conveyance device such as a crane or a conveyor. During inspection on the vehicle 100 by the inspection device 200, the server 300 causes the vehicle 100 to run automatically in response to a request from the inspection device 200.

The server 300 includes a CPU 310 as a central processing unit, a storage device 320, and a server communication unit 390. These units are connected to each other via an internal bus or an interface circuit, for example. The server communication unit 390 communicates with the vehicle 100, the inspection device 200, and others via the network 72.

The storage device 320 is a RAM, a ROM, a HDD, or an SSD, for example. The CPU 310 executes a computer program stored in the storage device 320. This causes the CPU 310 to function as a server controller 312, the vehicle speed acquisition unit 316, and a vehicle information acquisition unit 318. Meanwhile, some or all of these functions may be configured by a hardware circuit.

The vehicle information acquisition unit 318 acquires vehicle identification information about the vehicle 100 from a step management device provided at each step, for example. The "vehicle identification information" means various types of information with which the vehicle 100 is individually identifiable. The vehicle identification information includes ID information given to each vehicle 100 such as a vehicle identification number (VIN), a manufacturing number used for production management, and others, for example. The vehicle identification information may further include specification information about the vehicle 100 such as a vehicle type, a color, and a shape. The vehicle identification information to be used is not limited to information for identifying one vehicle 100 but may be information such as a lot number, for example, for identifying a plurality of the vehicles 100 on the basis of a certain unit. The vehicle identification information may be acquired from a radio frequency-identification (RF-ID) tag given to the vehicle 100 via short-distance radio communication, for example. The vehicle identification information may be acquired by reading a two-dimensional code attached to the vehicle 100 using a camera, for example.

The vehicle speed acquisition unit 316 acquires a running speed of the vehicle 100 detected by the vehicle 100, namely, acquires the vehicle side speed. In the present embodiment, the vehicle speed acquisition unit 316 acquires the vehicle speed data 188 belonging to the vehicle 100 via the server communication unit 390. The vehicle speed acquisition unit 316 may calculate a running speed of the vehicle 100 by acquiring a rotation speed of the wheel 160 from the wheel speed sensor 170. The acquired vehicle side speed is stored into the storage device 320 as vehicle speed data 322 associated with the vehicle identification information.

The server controller 312 transmits a control signal to the vehicle 100 via the server communication unit 390 for requesting remote control over the vehicle 100. When the vehicle 100 receives the request for remote control, the ECU 180 implements driving control. As a result, the vehicle 100 runs automatically.

During the self-running conveyance, the server controller 312 is arranged on a track in the factory to acquire vehicle information from a vehicle detector as an external sensor located external to the vehicle 100. The "vehicle information" means information including at least one of an image of the vehicle 100 and location information about the vehicle 100. For example, a camera may be used as the vehicle detector. The camera is connected to the server 300 in a manner communicable via radio communication or wire communication. The camera is fixed at a location allowing capturing of an image of the vehicle 100 running along the track in the factory, and acquires an image of the vehicle 100 as the vehicle information. The vehicle detector may acquire the location of the vehicle 100 instead of or in addition to an image of the vehicle 100. To acquire the location of the vehicle 100, the vehicle detector to be used is any type of detector capable of detecting the location of the vehicle 100 such as LiDAR, an infrared sensor, a laser sensor, an ultrasonic sensor, or a millimeter wave radar, for example. The "vehicle information" may further include a running direction of the vehicle 100 or the position of the vehicle 100. A running direction of the vehicle 100 or the position of the vehicle 100 may be acquired by detecting the shape of the vehicle 100 or a part of the vehicle 100, for example. Meanwhile, only the location of the vehicle 100 may be detected by the vehicle detector, and a running direction or the position of the vehicle 100 may be estimated using temporal change in the vehicle 100.

The server controller 312 generates a control value (running control signal), etc. about each actuator while analyzing the acquired vehicle information, and causes the ECU 180 to implement driving control over the vehicle 100 using the generated control value, etc. For example, the server controller 312 causes the vehicle 100 to run along a target route set in advance on the track by adjusting the location of the vehicle 100 relative to the target route through the analysis on the vehicle information.

The inspection device 200 conducts inspection to determine using a running speed detected by a device external to the vehicle 100 such as the inspection device 200 whether the vehicle 100 is capable of running normally by remote control. The running speed of the vehicle 100 detected by the inspection device 200 is also called an "inspection side speed" or simply a "measured value." A device provided at the inspection device 200 and detecting output relating to running of the vehicle 100 is also called an "inspection detection unit." The inspection device 200 determines whether abnormality is in the vehicle 100, in the server 300, or in the inspection device 200 when inspection result shows the presence of the abnormality.

The inspection device 200 includes a roller device 250, an inspection control device 210, and an inspection communication unit 290. The inspection communication unit 290 communicates with the server 300, the vehicle 100, and others via the network 72.

The roller device 250 acquires a running speed of the vehicle 100 as one embodiment of the "output value relating to running of the vehicle 100." The roller device 250 includes a roller 256, a motor 252, and a speed sensor 254. As shown in FIG. 1, when the vehicle 100 is placed at a location allowing the vehicle 100 to be inspected by the inspection device 200, the roller 256 comes into contact with a peripheral surface of the wheel 160 of the vehicle 100. In this state, the roller 256 rotates in response to the rotation of the wheel 160.

The motor 252 allows the roller 256 to rotate at a certain torque or rotation speed. With a rotation direction of the wheel 160 during forward moving of the vehicle 100 defined as a positive rotation direction and a rotation direction of the wheel 160 during backward moving of the vehicle 100 defined as a negative rotation direction, the motor 252 allows the wheel 160 to rotate in either the positive rotation direction or in the negative rotation direction by switching a rotation direction of the roller 256.

The speed sensor 254 is a sensor that detects a rotation speed of the roller 256. For example, a rotary encoder is usable as the speed sensor 254. The speed sensor 254 calculates a running speed of the vehicle 100 using the detected rotation speed of the roller 256. The running speed of the vehicle 100 may be calculated by the inspection control device 210 having acquired the rotation speed of the roller 256 from the speed sensor 254. The speed sensor 254 is one embodiment of the "inspection detection unit."

Figure 3:
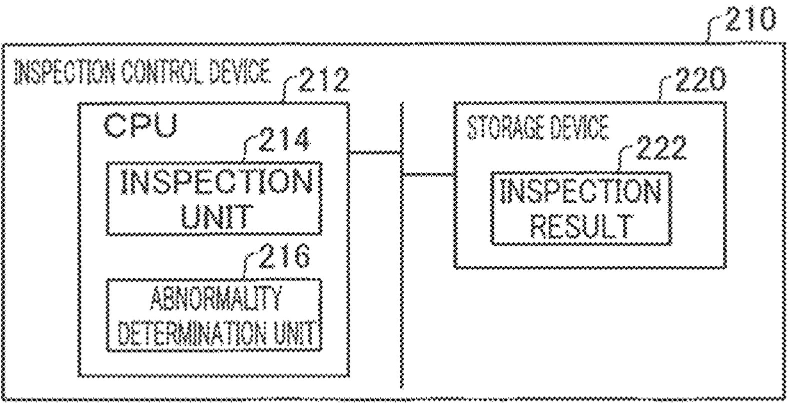
FIG. 3 is a block diagram showing an internal functional configuration of an inspection control device.

FIG. 3 is a block diagram showing an internal functional configuration of the inspection control device 210. The inspection control device 210 includes a CPU 212 as a central processing unit, and a storage device 220. These units are connected to each other via an internal bus or an interface circuit, for example.

The storage device 220 is a RAM, a ROM, a hard disk drive (HDD), or a solid state drive (SSD), for example. The storage device 220 stores inspection result 222 as result of the inspection of the present embodiment. A computer program stored in the storage device 220 is executed by the CPU 212, thereby causing the CPU 212 to function as an inspection unit 214 and an abnormality determination unit 216. Meanwhile, some or all of these functions may be configured by a hardware circuit.

The inspection unit 214 conducts inspection using the inspection side speed acquired by the roller device 250 to determine whether the vehicle 100 as an inspection target is capable of running normally by remote control. When result of the inspection by the inspection unit 214 indicates abnormality, the abnormality determination unit 216 implements an abnormality determining step as a processing routine of determining a cause for the abnormality. The result of the inspection by the inspection unit 214 and result of the determination about the cause for the abnormality by the abnormality determination unit 216 are stored as the inspection result 222 into the storage device 220.

Figure 4A:
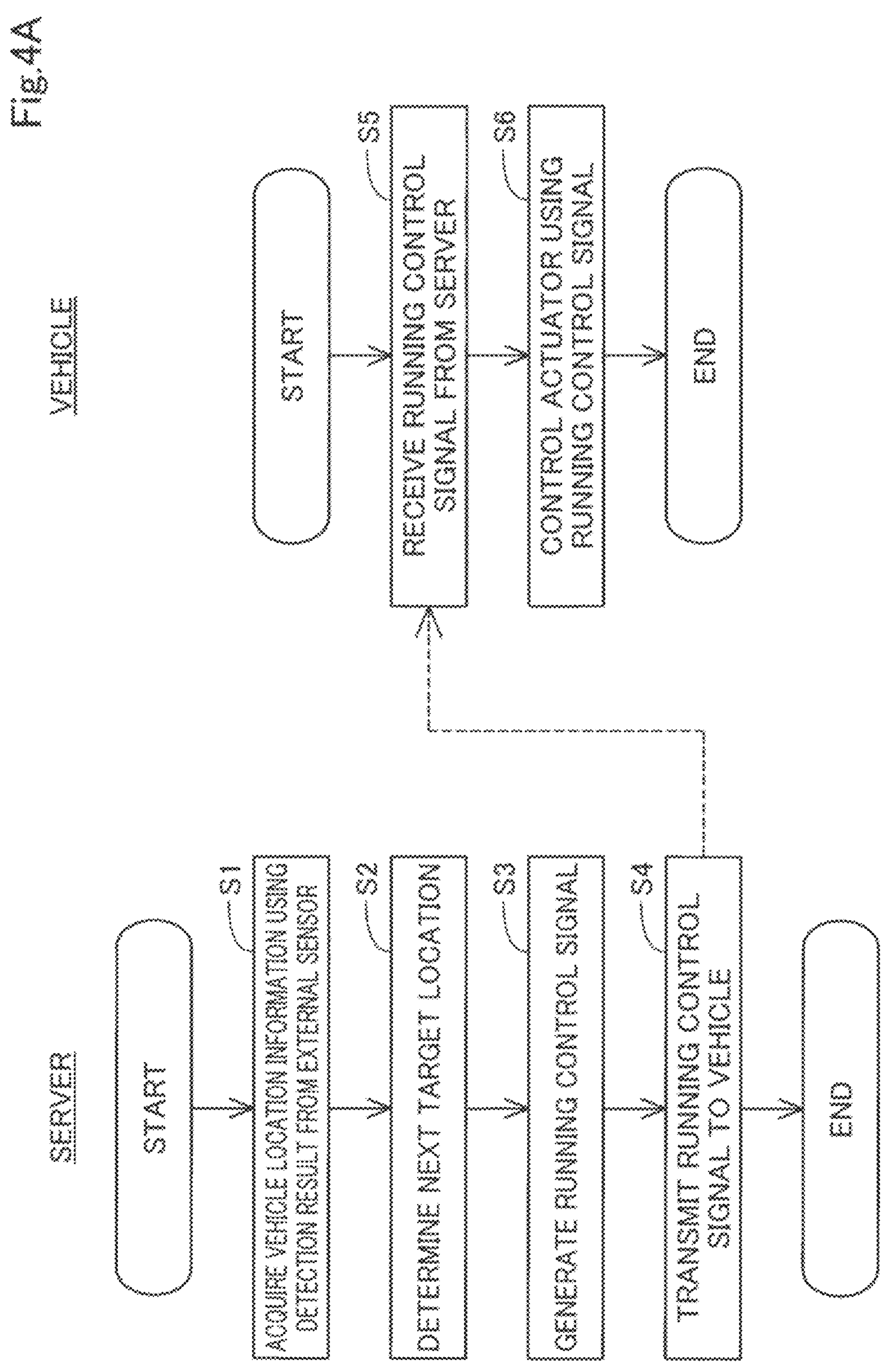
FIG. 4A is a flowchart showing a processing procedure for running control of the vehicle according to the first embodiment.

FIG. 4A is a flowchart showing a processing procedure for running control of the vehicle 100 in the first embodiment. In step S1, the server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S1, the server 300 acquires the vehicle location information using the captured image acquired from the camera as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 50 or outside the system 50. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 300 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the driving controller of the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system 50 in the present embodiment, it becomes possible to move the vehicle 100 without using a transport unit such as a crane or a conveyor.

In step S120, the abnormality determination unit 216 checks result of the auxiliary inspection. Specifically, the inspection unit 214 determines whether a difference between the inspection side speed acquired using the normal vehicle 100 and the target value is within a second range. The second range is settable to any range such as plus or minus 5 km/hr, plus or minus 10 km/hr, or equal to or greater than plus or minus 10 km/hr and equal to or less than plus or minus 5 km/hr, for example. In the present embodiment, the second range is set to the same range as the first range. Meanwhile, the second range and the first range may be set to ranges different from each other. For example, the second range may be set to a range narrower than the first range to impose a stricter inspection condition on the auxiliary inspection. When the difference between the inspection side speed and the target value is outside the second range so the presence of abnormality is determined as a result of the auxiliary inspection (S120: NO), the abnormality determination unit 216 moves the processing to step S130 to output information indicating the presence of the abnormality in the server 300. Step S130 is also called a "third step." In step S140, the abnormality determination unit 216 notifies information indicating the presence of the abnormality in the server 300 or information for urging repair of the server 300 to an administrator of the server 300, for example, and then finishes this flow.

When the difference between the inspection side speed and the target value is within the second range so the absence of abnormality is determined by the auxiliary inspection (S120: YES), the abnormality determination unit 216 moves the processing to step S150. In step S150, the abnormality determination unit 216 conducts subsequent inspection using a plurality of the vehicles 100 different from the vehicle 100 as the inspection target. The "subsequent inspection" means inspection to determine the presence or absence of abnormality by implementing the processing from step S10 to step S80 shown in FIG. 4 using a plurality of the vehicles 100 different from the vehicle 100 as the inspection target and different from the normal vehicle 100. The subsequent inspection is one embodiment of a determining step for determining whether there is abnormality in the inspection device 200. The subsequent inspection step is simply required to include at least the first step and the second step.

It is preferable for the plurality of the vehicles 100 used in the subsequent inspection step to be a plurality of the vehicles 100 scheduled to be inspected continuously and subsequently to the vehicle 100 as the inspection target. The subsequent inspection on the plurality of the vehicles 100 further functions as inspection generally conducted on these vehicles 100, making it possible to suppress productivity reduction resulting from an inspection step of the subsequent inspection. The number of the plurality of the vehicles 100 used in the subsequent inspection is settable to any number equal to or greater than two. In terms of improving inspection accuracy, a larger number of the vehicles 100 is preferred.

In step S160, result of the inspection using the plurality of the vehicles 100 is checked. When a difference between the acquired inspection side speed and an instructed target value is outside a third range in at least one vehicle 100 among the plurality of the vehicles 100 as a result of the subsequent inspection (S160: NO), the abnormality determination unit 216 moves the processing to step S170 to output information indicating the presence of abnormality in the inspection device 200. The third range is settable to any range such as plus or minus 5 km/hr, plus or minus 10 km/hr, or equal to or greater than plus or minus 10 km/hr and equal to or less than plus or minus 5 km/hr, for example. In the present embodiment, the third range is set to the same range as the first range. Meanwhile, the third range and the first range may be set to ranges different from each other. For example, the third range may be set to a range narrower than the first range to impose a stricter inspection condition on the subsequent inspection. In step S180, the abnormality determination unit 216 makes a notification indicating the presence of the abnormality in the inspection device 200 or a notification for urging repair of the inspection device 200 to an administrator of the inspection device 200, for example.

In step S160, when the difference between the acquired inspection side speed and the target value given as the instruction is within the third range in all the vehicles 100 among the plurality of the vehicles 100 as a result of the subsequent inspection (S160: YES), the abnormality determination unit 216 moves the processing to step S190 to output information indicating the presence of abnormality in the vehicle 100 as the inspection target. Step S190 is also called a "fourth step." In step S200, the server controller 312 causes the vehicle 100 as the inspection target to run by unmanned driving from the inspection step to a repair step where the vehicle 100 is repairable, and then finishes this flow.

As described above, the inspection method of the present embodiment includes the third step of outputting information indicating the presence of abnormality in the server 300 when the difference between the target value and the inspection side speed is outside the predetermined second range in the normal vehicle 100 as a result of the auxiliary inspection step. In this way, the auxiliary inspection using the normal vehicle 100 is conducted during the inspection on the vehicle 100 capable of running by remote control. Thus, of the vehicle 100 as the inspection target, the inspection device 200, and the server 300 as a remote control device, it is possible to determine that a cause for the abnormality is the server 300.

The inspection method of the present embodiment includes the subsequent inspection step of further performing at least the first step and the second step on a plurality of the vehicles 100 when the difference between the target value and the inspection side speed is within the predetermined second range in the normal vehicle 100 as a result of the auxiliary inspection step. The inspection method of the present embodiment includes the fourth step of outputting information indicating the presence of abnormality in the inspection target when the difference between the target value and the inspection side speed is within the predetermined third range in all the vehicles 100 among the plurality of the vehicles 100 as a result of the subsequent inspection step. In this way, the subsequent inspection using the plurality of the vehicles 100 as a larger number of samples is conducted during inspection to determine whether the vehicle 100 movable by remote control runs normally. Thus, of the vehicle 100 as the inspection target and the inspection device 200, it is possible to determine that a cause for the abnormality is the vehicle 100 as the inspection target.

In the inspection method of the present embodiment, the normal vehicle 100 is a moving object that is at least one of the vehicle 100 determined to be free from abnormality as a result of inspection by the inspection device 200 conducted while the vehicle 100 is moved by manual operation and the vehicle 100 determined to be free from abnormality as a result of implementation of at least the first step and the second step by an inspection device different from the inspection device 200. Thus, it is possible to prepare the normal vehicle 100 by a simple way.

In the inspection method of the present embodiment, when an output indicating the presence of abnormality in the server 300 is made, the abnormality in the server 300 is notified to an administrator of the server 300. Notifying the determination result about the cause for the abnormality allows the server 300 to be repaired in an early stage.

B. Second Embodiment

FIG. 6 is a flowchart showing a processing routine of an inspection method according to a second embodiment. The inspection method of the first embodiment has been described by giving the example where inspection is conducted for abnormality relating to a running speed of the vehicle 100. The inspection method of the present embodiment conducts inspection to determine whether the brake 162 of the vehicle 100 works properly. As shown in FIG. 6, this flow differs from the inspection method of the first embodiment shown in FIG. 4 in that it includes steps S30*b*, S50*b*, S70*b*, and S80*b* instead of steps S30, S50, S70, and S80 respectively, it further includes step S72, and it does not include step S40. This flow may be implemented while the vehicle 100 is kept located at the inspection device 200 continuously from completion of the inspection in the first embodiment, for example. In this case, steps S10 and S20 are omissible from this flow.

In step S30*b*, the inspection unit 214 gives an instruction to the vehicle 100 as an inspection target to cause the brake 162 as the stopping unit to work to stop the rotation of the wheel 160, namely, stop a running motion of the vehicle 100. More specifically, the inspection unit 214 outputs a command signal (running control signal) to the server 300 for causing the brake 162 to work in such a manner as to exert braking force as a predetermined target value. In response to acceptance of the command signal, the server controller 312 causes the brake 162 of the vehicle 100 as the inspection target to work by remote control as an example of control by unmanned driving in such a manner as to exert the predetermined braking force, thereby stopping the running motion of the vehicle 100. Step S30*b* is also called a "stop instructing step."

In step S50*b*, the server controller 312 makes an output to the inspection device 200 indicating that the brake 162 has been caused to work according to the target value. In step S70*b*, the inspection unit 214 drives the motor 252 of the roller device 250 to rotate the roller 256. More specifically, the inspection unit 214 rotates the roller 256 in contact with the wheel 160 to apply external force to the wheel 160 for rotating the wheel 160 in the positive rotation direction. The "external force for rotating the wheel 160 in the positive rotation direction" is force applied to an outer periphery of the roller 256 by the motor 252 or a torque of the roller 256 corresponding to this force. The inspection unit 214 increases the torque of the roller 256 stepwise until the rotation of the wheel 160 is detected by the speed sensor 254, for example. When the roller 256 is rotated, the inspection unit 214 detects the rotation of the roller 256, namely, the rotation of the wheel 160 using the speed sensor 254 in step S72. The inspection unit 214 acquires the torque applied to the roller 256 with timing of detection of the rotation of the wheel 160. Steps S70*b* and S72 are also called an "external force acquiring step."

In step S80*b*, it is determined whether a difference between the torque applied to the roller 256 with the timing of detection of the rotation of the wheel 160 and a torque corresponding to braking force as the target value is within a predetermined target external force range. The target external force range is settable to any range such as plus or minus 5 Nm (newton-meter) in the case of a torque or plus or minus 5 N (newton) in the case of external force, for example. In step S80*b*, it is possible to determine whether braking force conforming to the target value is applied from the brake 162 to the wheel 160. It is further possible to conduct inspection for a trouble whereby the wheel 160 is not rotated even by application of certain external force while the brake 162 is working.

When the difference between the torque applied to the roller 256 and the torque corresponding to the braking force as the target value is within the target external force range (S80*b*: YES), the inspection unit 214 moves the processing to step S84 to output information indicating the absence of abnormality. When the difference between the torque applied to the roller 256 and the torque corresponding to the braking force as the target value is outside the target external force range (S80*b*: NO), the inspection unit 214 moves the processing to step S82 to determine that there is abnormality, and moves the processing to step S100*b* where an abnormality determining step according to the second embodiment is performed.

FIG. 7 is a flowchart showing a processing routine of the abnormality determining step of the inspection method according to the second embodiment. The abnormality determining step of the present embodiment differs from the abnormality determining step described in the first embodiment in that it includes step S120*b* instead of step S120 and step S160*b* instead of step S160, and is otherwise the same as the abnormality determining step of the first embodiment.

In step S120*b*, result of inspection using the normal vehicle 100 is checked. More specifically, the processing from step S10 to step S80*b* shown in FIG. 6 is performed using the normal vehicle 100. In the present embodiment, the normal vehicle 100 means the vehicle 100 where normal braking force is applied from the brake 162 to the wheel 160. Inspection is conducted to determine whether a difference between a torque applied to the roller 256 and a torque corresponding to braking force as a target value is within an auxiliary target external force range using a plurality of the vehicles 100. The auxiliary target external force range is settable in the same way as the target external force range. In the present embodiment, the auxiliary target external force range is set to the same range as the target external force range. Meanwhile, the auxiliary target external force range and the target external force range may be set to ranges different from each other by narrowing the auxiliary target external force range compared to the target external force range, for example. When the difference between the torque of the roller 256 and the torque as the target value is outside the auxiliary target external force range in the normal vehicle 100 (S120*b*: NO), the processing is moved to step S130 to output information indicating the presence of abnormality in the server 300. The processing from step S120*b* to step S130 is also called an "abnormality outputting step."

In step S160*b*, result of inspection using a plurality of the vehicles 100 is checked. More specifically, the processing from step S10 to step S80*b* shown in FIG. 6 is performed using the plurality of the vehicles 100. When a difference between a torque of the roller 256 and a torque as a target value is within a predetermined subsequent target external force range in all the vehicles 100 among the plurality of the vehicles 100 (S160*b*: YES), the processing is moved to step S190 to output information indicating the presence of abnormality in the inspection target. When the difference between the torque of the roller 256 and the torque as the target value is outside the predetermined subsequent target external force range in at least one vehicle 100 among the plurality of the vehicles 100 (S160*b*: NO), the processing is moved to step S170 to output information indicating the presence of abnormality in the inspection device 200. In present embodiment, the subsequent target external force range is set to the same range as the target external force range. Meanwhile, the subsequent target external force range and the target external force range may be set to ranges different from each other by narrowing the subsequent target external force range compared to the target external force range, for example.

As described above, the inspection method of the present embodiment includes the abnormality outputting step of outputting information indicating the presence of abnormality in the server 300 when a difference between the torque applied to the roller 256 acquired with timing of the rotation of the wheel 160 and the torque as the target value is outside the predetermined auxiliary target external force range in the normal vehicle 100 as a result of the auxiliary inspection step. Thus, of the vehicle 100 as the inspection target, the inspection device 200, and the server 300 as a remote control device, it is possible to determine that a cause for the abnormality is the server 300 during inspection on the brake 162 of the vehicle 100 to run by remote control using unmanned driving.

C. Other Embodiments (C1) The example shown in each of the above-described embodiments includes steps S150, S160 or S160*b*, S170, S180, S190, and S200. Meanwhile, these processes are omissible. Even in this case, performing the processes in steps S120 or S120*b*, S130, and S140 still makes it possible to determine whether abnormality is in the server 300.

(C2) The inspection methods shown as the examples in the corresponding embodiments described above are to conduct inspection to determine whether a running speed of the vehicle 100 and the brake 162 of the vehicle 100 are proper. Meanwhile, the present disclosure is applicable to an inspection method of conducting inspection to determine the properness of a detection value obtained by each type of detector provided at the vehicle 100 that may be an acceleration sensor, a sensor for detecting a state of charge of the battery 120, or a sensor for detecting a distance to a target external to the vehicle 100, for example.

(C3) In each of the examples shown in the above-described embodiments, a plurality of the vehicles 100 scheduled to be inspected continuously and subsequently to the vehicle 100 as an inspection target is used as a plurality of the vehicles 100 different from the inspection target in step S150. Meanwhile, a plurality of the vehicles 100 freely extracted and not involved in the schedule of the inspection may be used.

(C4) In the example shown in each of the above-described embodiments, the CPU 310 of the server 300 functions as the server controller 312, the vehicle speed acquisition unit 316, and the vehicle information acquisition unit 318. Meanwhile, all or some of the functions of the server controller 312, the vehicle speed acquisition unit 316, and the vehicle information acquisition unit 318 may be realized by the CPU 212 of the inspection control device 210.

(C5) In the example shown in the above-described first embodiment, when a difference between an acquired inspection side speed and a target value is outside the second range in the normal vehicle 100 as a result of the auxiliary inspection, the subsequent inspection step is performed. Meanwhile, the subsequent inspection step may be omitted. In this case, step S120 may include a step of outputting information indicating the presence of abnormality in either a vehicle as an inspection target or the inspection device 200 or information indicating the absence of abnormality in the server 300 to be performed when the difference between the acquired inspection side speed and the target value is within the second range in the normal vehicle 100.

(C6) In the example shown in the above-described first embodiment, when information indicating the presence of abnormality in an inspection target is output, the inspection target is moved by unmanned driving to a place where the inspection target is repairable. Meanwhile, in the presence of abnormality in the inspection target, a different process such as notification to an administrator may be performed instead of or together with moving of the inspection target by remote control.

(C7) In the example shown in each of the above-described embodiments, the vehicle 100 is a passenger car, a truck, a bus, a vehicle for construction, or others. However, the vehicle 100 is not limited to these examples by may include various types of automobiles and trains such as two-wheel vehicles and four-wheel vehicles. Various types of moving objects other than the vehicle 100 are also applicable. The "moving object" means a movable object. The moving object includes a vehicle, and includes a ship, an aircraft, a robot, a linear motor car, and others. In this case, the terms "vehicle" and "car" of the present disclosure are replaceable with a "moving object" as appropriate, and the term "running" of the present disclosure is replaceable with "moving" as appropriate. The inspection device 200 detects a moving motion of a moving unit that moves the moving object instead of detecting the rotation of the wheel 160, thereby acquiring an inspection side speed of the moving object during moving thereof.

(C8) The vehicle 100 is simply required to have a configuration movable by unmanned driving. The vehicle 100 may be embodied as a platform having the following configuration, for example. More specifically, the vehicle 100 is simply required to have a configuration for fulfilling functions including "run," "turn," and "stop" by remote control. Specifically, the "vehicle 100 movable by remote control" may not be required to be equipped with at least some of interior parts such as a driver's seat and a dashboard, may not be required to be equipped with at least some of exterior parts such as a bumper and a fender, or may not be required to be equipped with a bodyshell. In such cases, a remaining part such as a bodyshell may be mounted on the vehicle 100 before the vehicle 100 is shipped from a factory, or a remaining part such as a bodyshell may be mounted on the vehicle 100 after the vehicle 100 is shipped from the factory without the remaining part such as a bodyshell on the vehicle 100.

(C9) In the above-described first embodiment, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device.

(C10) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C11) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C12) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method thereof described in the present disclosure may be realized by a dedicated computer provided by configuring a processor and a memory programmed in such a manner as to implement one or a plurality of functions embodied by a computer program. Alternatively, the controller and the method thereof described in the present disclosure may be realized by a dedicated computer provided by configuring a processor using one or more dedicated hardware logic circuits. Still alternatively, the controller and the method thereof described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The present disclosure is not limited to the embodiments described above and is able to be realized with various configurations without departing from the spirit thereof. For example, technical features in the embodiments corresponding to the technical features in the aspects described in the section of SUMMARY are able to be replaced with each other or combined together as necessary in order to solve part or the whole of the problems described previously or to achieve part or the whole of the effects described previously. When the technical features are not described as essential features in the present specification, they are able to be deleted as necessary.

What is claimed is:

1. An inspection method of inspecting a moving object movable by unmanned driving, comprising:

a first step of giving an instruction from a server to a moving object as an inspection target to drive the moving object in such a manner that an output value relating to moving of the moving object becomes a predetermined target value;

a second step of measuring the output value and acquiring a measured value using an inspection device for inspection on the moving object;

a third step of performing the first step and the second step on a normal moving object different from the moving object as the inspection target and about which the output value is normal when a difference between the target value and the measured value is not within a predetermined first range; and a fourth step of outputting information indicating the presence of abnormality in the server when the difference between the target value and the measured value is outside a predetermined second range in the normal moving object as a result of the third step.

2. The inspection method according to claim 1, comprising:

a fifth step of further performing the first step and the second step on a plurality of the moving objects different from the moving object as the inspection target and different from the normal moving object when the difference between the target value and the measured value is within the second range in the normal moving object as a result of the third step; and a sixth step of outputting information indicating the presence of abnormality in the moving object as the inspection target when the difference between the target value and the measured value is within a predetermined third range in all the moving objects among the plurality of the moving objects as a result of the fifth step.

3. The inspection method according to claim 1, wherein the normal moving object is at least one of a moving object determined to be free from abnormality as a result of inspection by the inspection device conducted while the moving object is moved by manual operation and a moving object determined to be free from abnormality as a result of implementation of the first step and the second step by an inspection device different from the inspection device.

4. The inspection method according to claim 1, wherein when information indicating the presence of abnormality in the server is output, the abnormality in the server is notified to an administrator of the server.

5. An inspection method of inspecting a moving object capable of moving and capable of being stopped moving by unmanned driving, comprising:

a stop instructing step of giving an instruction from a server to a moving object as an inspection target to cause a stopping unit of the moving object to work to stop a moving motion of the moving object in such a manner that braking force applied by the stopping unit becomes a predetermined target value;

an external force acquiring step of applying external force for causing the moving object to make the moving motion to the moving object as the inspection target while increasing the external force stepwise, and acquiring the external force using an inspection device for inspection on the moving object, the external force being acquired with timing of switching from a state where the moving motion is stopped by the stopping unit to a state where the moving motion is made;

an auxiliary inspection step of performing the stop instructing step and the external force acquiring step on a normal moving object different from the moving object as the inspection target and in which the braking force is normal when a difference between the external force acquired with the timing and external force corresponding to the target value is not within a predetermined target external force range; and an abnormality outputting step of outputting information indicating the presence of abnormality in the server when the difference between the external force acquired with the timing and the external force corresponding to the target value is outside a predetermined auxiliary target external force range in the normal moving object as a result of the auxiliary inspection step.

* * * * *